United States Patent
Harris

(10) Patent No.: US 7,859,219 B2
(45) Date of Patent: Dec. 28, 2010

(54) DISCONNECT FOR A CHARGING UNIT FOR AN ELECTRIC VEHICLE

(76) Inventor: David M Harris, P.O. Box 1389, Rancho Santa Fe, CA (US) 92067

( * ) Notice: Subject to any disclaimer, the term of this patent is extended or adjusted under 35 U.S.C. 154(b) by 151 days.

(21) Appl. No.: 11/672,163

(22) Filed: Feb. 7, 2007

(65) Prior Publication Data

US 2008/0185991 A1    Aug. 7, 2008

(51) Int. Cl.
  *H02J 7/14* (2006.01)
  *H01R 11/30* (2006.01)
  *H01R 33/00* (2006.01)
  *H01R 13/62* (2006.01)
(52) U.S. Cl. ............... 320/104; 439/180; 439/39
(58) Field of Classification Search ............ 439/39, 439/180
  See application file for complete search history.

(56) References Cited

U.S. PATENT DOCUMENTS

| | | | | |
|---|---|---|---|---|
| 4,157,855 A | * | 6/1979 | Chan | 439/155 |
| 5,385,480 A | * | 1/1995 | Hoffman | 439/310 |
| 5,478,250 A | * | 12/1995 | Hoffman | 439/142 |
| 5,536,173 A | * | 7/1996 | Fujitani et al. | 439/34 |
| 5,556,284 A | * | 9/1996 | Itou et al. | 439/34 |
| 5,816,643 A | * | 10/1998 | Itou et al. | 296/97.22 |
| 2007/0026728 A1 | * | 2/2007 | Mak | 439/505 |
| 2007/0072442 A1 | * | 3/2007 | DiFonzo et al. | 439/39 |

* cited by examiner

*Primary Examiner*—Edward Tso
*Assistant Examiner*—Ahmed Omar
(74) *Attorney, Agent, or Firm*—Law Office of Scott C. Harris, Inc.

(57) ABSTRACT

A device for a plug in vehicle includes a cord with a ball-like covering that allows it to be dropped. The cord bounces when dropped, and no damage is caused. There is also an electrical actuator that is based on when the vehicle is in a mode that allows it to be charged. When the vehicle is in the charge mode, the actuator either magnetically attracts the cord, or tightens against the cord to hold it more tightly If the vehicle is put in reverse, for example, the actuator is deenergized, and the cord is less tightly held, facilitating its disconnection.

15 Claims, 3 Drawing Sheets

US 7,859,219 B2

DISCONNECT FOR A CHARGING UNIT FOR AN ELECTRIC VEHICLE

BACKGROUND

A number of different kinds of electric driven or electric assisted vehicles have been suggested. Each of these vehicles use a battery that stores some kind of charge to use as power for driving the vehicle. The battery drives one or more motors that drive the vehicle.

A hybrid vehicle is run based on either fuel or electricity. A hybrid vehicle can either obtain charge for the battery regeneratively, such as by recovering charge from braking or from other operations in the vehicle. The battery can also be charged from electric power. A vehicle can also be purely electric, in which case the vehicle runs purely off the battery charge.

Vehicles that can be charged from electric power are called plug-in hybrids. These may be any of these kinds of vehicles. Such a vehicle may run solely from battery power, or may run from battery and/or fuel.

Typically, a plug in hybrid must be plugged in each time that it is parked. however, this means that the plug must be disconnected before the vehicle can be moved.

SUMMARY

The present application teaches mechanical structure that facilitates disconnection of a plug-in hybrid. Specifically, the structure disclosed herein may prevent damage to either the vehicle or the charging cord in the almost inevitable event that a user forgets to unplug the charging vehicle prior to use.

BRIEF DESCRIPTION OF THE DRAWINGS

These and other aspects will now be described in detail with reference to the accompanying drawings, wherein.

DETAILED DESCRIPTION

Figure 1:
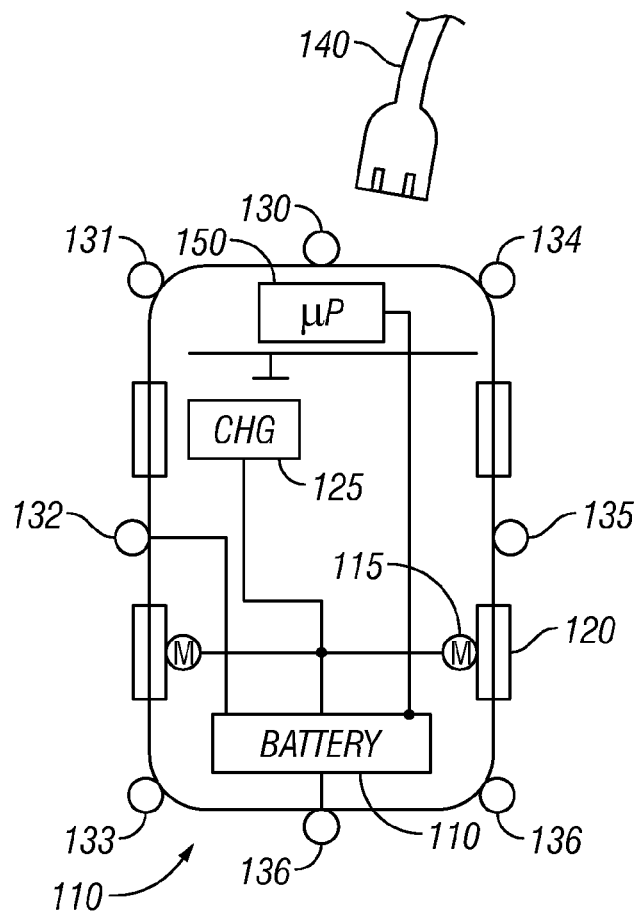
FIG. 1 shows a basic block diagram of an electric car, and probable plug-in locations for battery charging.

A basic block diagram of an electric vehicle is shown in FIG. 1. The vehicle 100 includes a battery 110 that drives a motor 115 to provide power to at least one wheel 120. In an embodiment, the vehicle may be an automobile.

The battery can be charged via charging system 125 that obtains power from various functions of the automobile, such as from regenerative braking, or from other kinds of movement that is otherwise wasted. The charging system 125 may be optional. In this embodiment, however, there must be an external connection for an externally applied charge for the battery. In the FIG. 1 embodiment, the battery 110 can be charged via a plug-in connection.

FIG. 1 shows the many different places where a plug-in connection might be plugged into the vehicle. 130 shows a connection at the front of the car. Different connections on the side of the car include areas 131, 132, 133 on the driver side and 134, 135, 136 on the passenger side. The battery can also be charged via a port 136 on the rear of the vehicle, typically the closest location to the battery 110. The vehicle may have one or many different ports through which the power can be applied.

A charging cord is shown as 140. This charging cord may simply be an AC cord carrying AC power, or may be a DC cord that carries DC power or any other type of power.

Depending on the position of the vehicle relative to the charging cord, it may be difficult to predict with any kind of certainty how the vehicle will be moved after charging. For example, if FIG. 1 illustrates a garage, the vehicle may be backed up to leave the garage. Therefore, if the charging cord is plugged into port 130, backing up will pull in more or less the direction to simply pull the plug 140 out of its socket 130. However, if the plug is plugged into socket 134, pulling backwards may cause damage to either the cord, or the socket on the vehicle, or both.

Different embodiments disclosed herein describe different ways of avoiding damage when the user forgets that the car is plugged in, and moves the vehicle without disconnecting the cord.

Figure 2:
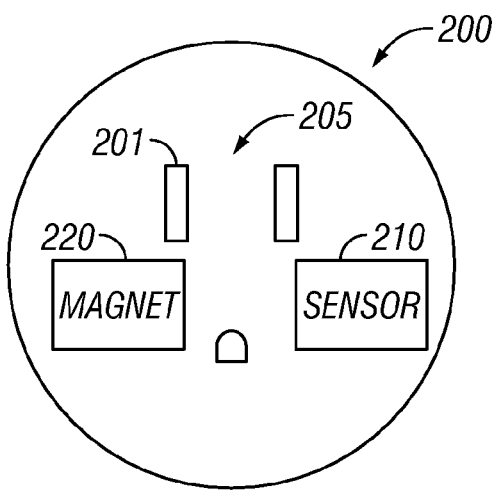
FIG. 2 shows a socket in an embodiment.

According to a first embodiment, the car-mounted socket 200 has connective electrical jack portions 205 that can be connected to the charging cord. FIG. 2 illustrates a standard three prong jack 205, however it should be understood that any different kind of arrangement could be used. The socket also includes a sensor block 210. In this embodiment, the sensor block 210 is connected to the controlling processor 150 in the automobile. The sensor block 210 detects the proximity and connection of an electric cord. When the electric cord is connected, the vehicle is prevented from either starting or moving. For example, the vehicle may be allowed to start, but prevented from being taken out of "park". A message is displayed to the user, indicating something like "vehicle immobilized, electric charging is connected."

In this way, the user is prevented from driving away while the charging cord is attached.

The sensor 210 may be as simple as a Hall effect sensor that detects current flow, or may be a more complicated proximity sensor that detects that the proximity of the actual electric cord 140.

The sensor 210 may also carry out other functions as described herein with reference to other embodiments.

The socket assembly may also include an electrically actuable magnet 220 that positioned and usable to attract the plug that is close to the magnet. FIG. 2 shows a rectangular magnet. Alternatively, the magnet 220 may be arcuate in shape.

Figure 3A:
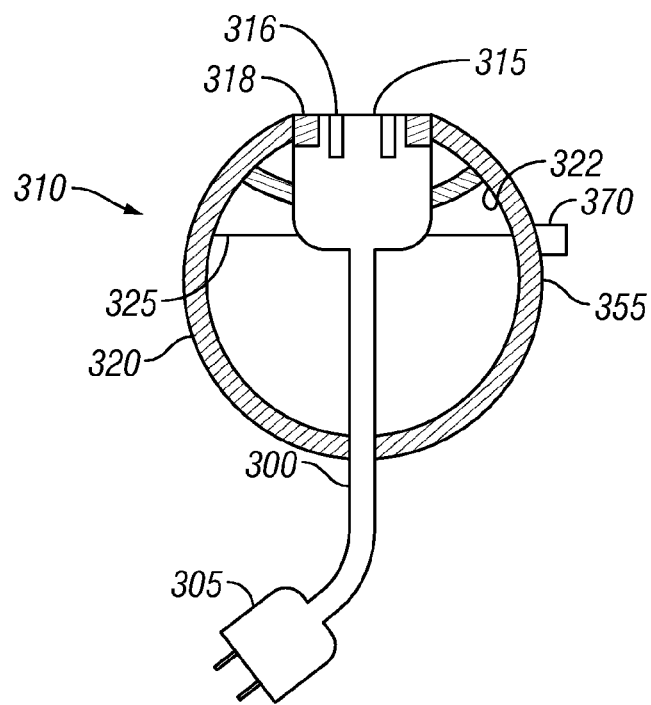
FIGS. 3A and 3B show aspects of the charging cord.
Figure 3B:
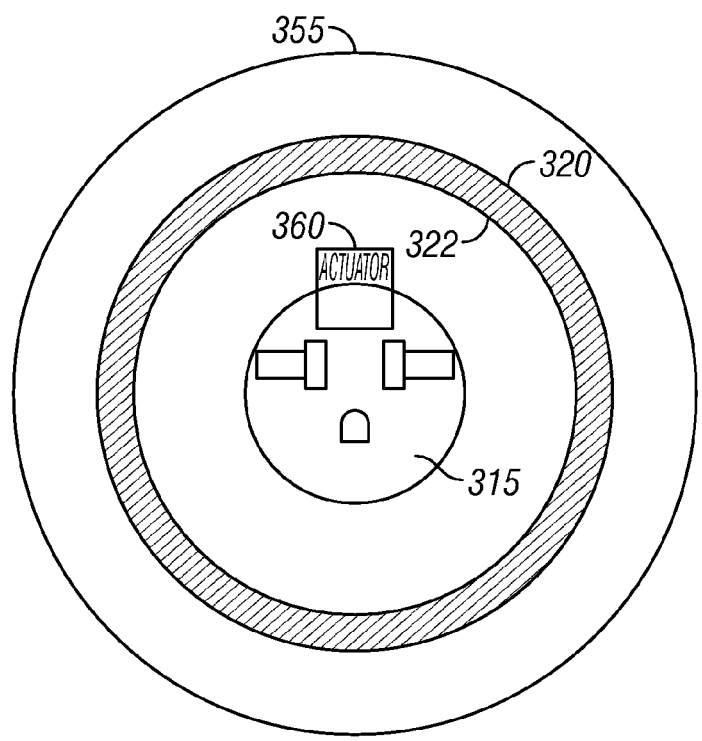

FIGS. 3A-3B illustrate an electric cord that can be plugged into the socket shown in FIG. 2. In an embodiment, the electric cord 300 may be a conventional AC electric cord with a first end 305 that is adapted to be plugged into a conventional wall mounted electric outlet, and a second end 310 that plugs into the Jack 205 shown in FIG. 2. In the embodiment, the second end 310 includes a plug portion 315 which includes electrical prongs such as 316 that connect to corresponding electric prongs 201 of the Jack 205. The plug portion 315 also includes a metal or magnet portion 318 positioned to magnetically interact with the corresponding magnet portion 220 of the Jack 200. The magnet portion may be substantially circular, extending circumferentially around the outside of the plug, or may be in one location only.

Damage might occur when the plug is pulled out of the vehicle very quickly, for example by accident when the user pulls away while the plug is plugged in. If that happens, the plug could bang against a hard garage floor or the like. This could break or otherwise damaged the plug. In this embodiment, the second end 310 is surrounded by a protective sheath 320. The protective sheath 320 may be a section of a sphere, for example a elastomeric, e.g., rubber partial sphere that is connected by connection structures 325 to the plug portion 315. For example, the sheath 320 may be like a cut-open tennis ball that is connected to both the cord and to the plug portion. The sphere 320 is open at section 322 so that the plug 315 can be attached to the jack 205. However, if the plug 315 is dropped, then the sphere 320 will effectively bounce on the floor, and will not be damaged by hitting the floor even from a great height. Therefore, the cord can be pulled out of the automobile when the automobile is driven while being plugged in. The cord will fall, but bounce on the sphere portion. No damage will occur even if the automobile is driven away while plugged in.

FIG. 3B illustrates a front on view of the structure, showing a cross-sectional view of the sphere 320, the plug 315, and also showing how the opening 322 allows access to the plug 315. Since the ball diameter gets progressively larger, FIG. 3B shows the largest point 355 of the open sphere 320.

An additional embodiment may include an actuator 360. In the embodiment, the jack 205 includes blades such as 201. The mating plug portion 315 therefore includes a female connection which fits around the blades 201. One way of facilitating the disconnection is that the female connection tightens and loosens around the blades 201. In the normal, unactuated condition, the female connection is loose around the blades 201. However, this loose connection would not facilitate a good electrical connection between the female connection 315 and the male blades 201. Therefore, an embodiment has an actuator 360 which selectively tightens the connection of the female portion 315 around the male portion 201. For example, the female portion 315 may include electrical contacts that are spaced from one another by a distance that is larger than an outer size of the blade 201. The actuator moves those contacts closer together, to grip the blade 201. The actuator 360 may be controlled by a magnetically actuated switch 366, that is closed by the actuation of the electromagnet 220. The electromagnet 220 is actuated only when the vehicle is in a mode where it can be charged.

In an embodiment, it is contemplated that the female portion would be on the electric cord that connects to the automobile, and that the automobile would have the male portion. However, these may be reversed, in which case the actuator would actually be on the plug shown in FIG. 2. The actuator 360 may be, for example, a piezoelectric device which selectively tightens the metal contacts within the female connection against the corresponding blades in the male connection.

The actuator 360 requires power, and accordingly this may be powered by the actual electricity supplied over the plug 300. In the embodiment, sensing by the sensor 210, or other proximity sensor, may be used to actuate the actuator 360 to selectively tighten against the plug.

Also in an embodiment, the plug is held to the jack any time the car is properly in a condition in which it can be charged, such as when the car is in park, or the ignition key is off, or whatever other condition indicates that the vehicle can be charged by a plug in plug. This condition may be detected by any vehicle mounted device, e.g., the controlling processor 150, or any other circuit, or a mechanical interlock. The holding can be maintained by the actuator 360 tightly held against the male blades, or the electromagnet 220 holding the corresponding metal portion 318.

However, when the car is removed from park, the processor 150 operates to release the holding. At this point, the plug is loosely fitted on its corresponding portion in the actuator embodiment, and can be removed very easily. In the magnetic attraction embodiment, the magnetic connection is released.

In another embodiment, there may be a disconnect control shown as 370, either on the outside of the protective sphere 320, or located anywhere else on the cord. The disconnect control causes the actuator 360 to disconnect, thereby allowing easy removal of the plug from the corresponding jack. Either way, however, if the car is improperly moved, the actuator is disconnected, causing the blades to be removed from the plug.

In another embodiment, it is noted that the plug assembly 140 may actually be connected into the vehicle from an angle that prevents easy plug release when the vehicle backs up. For example, if the plug 140 is connected into section 134, damage could occur if the vehicle goes straight backwards. The embodiment of FIG. 4A-4B may address this.

Figure 4A:
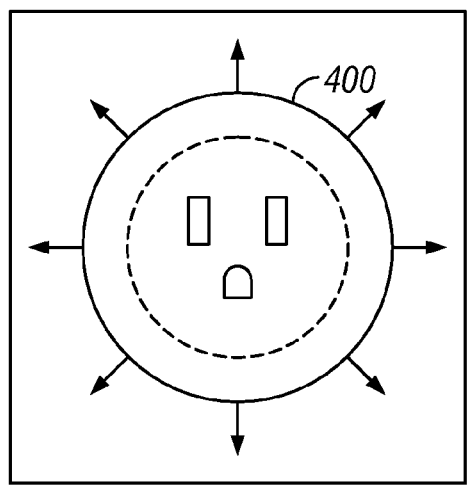
FIGS. 4A and 4B show aspects of the rotatable plug.
Figure 4B:
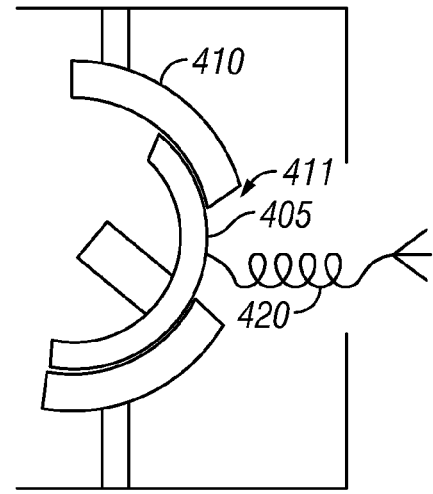

In the FIG. 4A embodiment, the car-mounted socket 400, here shown as a male plug, includes a ball that is pivotable in both of pan and tilt directions. This is done by attaching the plug assembly 400 to a support section 405 that is shaped in the shape of a portion of a sphere. This arc of the sphere is mounted within, and maintained as a captive within, a second spherical supporting section 410. The plug holding spherical section 405 is movable within the supporting section 410. Therefore, as shown in FIG. 4A, the plug can move in the up-and-down direction, in side to side directions, and can move to any angle in both those directions, limited only by the mechanical stops of the system.

In an embodiment, the plug 400 is fed by a coiled cord 420 which can be moved to a plurality of different positions. The supporting section 410 includes an opening 411 through which coiled cord 420 extends. The opening only has a certain size, and the position of the cord on the support section 405 limits the range of possible movement of the plug holding support section 405.

In this way, any angle that the vehicle may assume relative to the Jack can be supported by the rotational movement of the support section.

Figure 5:
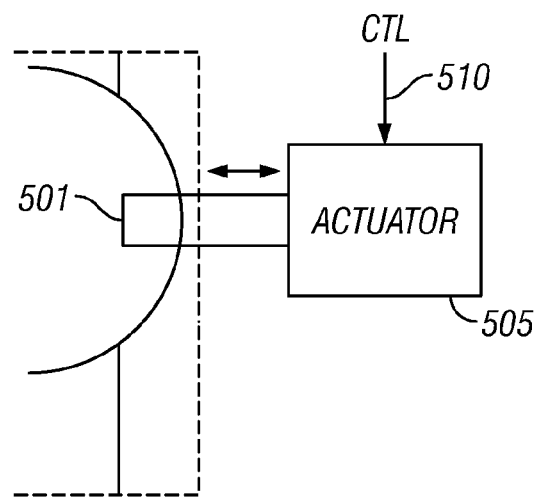
FIG. 5 shows an embodiment with movable plug blades.

FIG. 5 illustrates yet another embodiment which can be usable with any of the embodiments disclosed previously. In this embodiment, the conductive blade 500 which receives the power from the charging cord is controlled by an actuator 505. The actuator 505 controls movement of the blade in the inward and outward directions, so that the blade can retract responsive to the control signal 510. The control signal may be sent by a user putting the vehicle into drive from park. A signal is sent which quickly retract the cord blades, thereby quickly removing contact and connection between the supplying power cord and the jack. The cord may then fall to the floor, but preferably uses the embodiment of FIG. 3, so that it will not be damaged.

The actuator 505 may also provide some expansion of the blade, to cause it to fit more snugly into the Jack. In addition, actuator 505 can be used in conjunction with the actuator 360 shown in FIG. 3B, so that both actuators can simultaneously engage and disengage, thereby more quickly removing the connection.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, the "sexes" of the car mounted socket/plug and the cord may be easily reversed, and any of the structures discussed herein may be interchanged between car mounted part, and cord mounted part.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

The automobile controllers described herein may be any kind of computer, either general purpose, or some specific purpose computer such as a workstation. The processor may be a Pentium class computer, running Windows XP or Linux, or may be a Macintosh computer. The controller may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned.

What is claimed is:

1. A device, comprising:
    a vehicle detection part, that detects whether said vehicle is in a first stationary mode in which the vehicle is stationary and produces a charging indication indicative of said vehicle being stationary, said vehicle detection part also detecting if said vehicle is in a second mode where it is in a movable state;
    a connection socket, coupled to said vehicle, accepting electrical power for charging of the vehicle when connected to a source of power, one of said connection socket or said source of power having a first electrical contact which is an elongated contact, and the other of said connection socket and said source of power includes second and third electrical contacts which are spaced from one another; and
    a cord controlling part, having an actuator control causing a change in an amount of space between said second and third electrical contacts, such that said first electrical contact is held between said second and third contacts more securely when said indication represents said first stationary mode that indicates that the vehicle is stationary, and such that said first electrical contact is less securely held when said indication represents that said vehicle is in said second mode where said vehicle is movable;
    wherein said connection socket includes a pivot that moves said electrical contacts in directions to face in a direction parallel to a direction of force.

2. A device as in claim 1, wherein said second and third electrical contacts are in said connection socket.

3. A device as in claim 1, wherein said second and third electrical contacts are on a cord that connects to said first electrical contact in said connection socket.

4. A device as in claim 1, wherein said stationary mode represents said car being in park.

5. A device as in claim 1, Where said elongated element is a blade.

6. A device, comprising:
    a vehicle detection part, that detects whether said vehicle is in a first stationary mode in which the vehicle is stationary and produces a first indication indicative of said vehicle being stationary, said vehicle detection part also detecting if said vehicle is in a second mode where it is in a movable state;
    a connection socket, coupled to said vehicle, accepting electrical power for charging of the vehicle when a source of power is connected, where one of said connection socket and said source of power includes a first electrical contact in the shape of an elongated element and the other of said connection socket and said source of power includes second and third electrical contacts which are spaced from one another; and
    a cord controlling part, having an actuator causing a movement that changes an amount of a space between said second and third electrical contacts, to automatically move said second and third electrical contacts closer together to hold said first electrical contact tight between said second and third electrical contacts when said indication represents said first stationary mode that indicates that the vehicle is stationary, and to automatically move said second and third electrical contacts further apart relative to one another to hold said second electrical contact less tight between said second and third electrical contacts, when said indication represents that said vehicle is in said second mode where said vehicle is movable;
    wherein said connection socket includes a pivot that pivots a direction of said connection socket to move a direction of said contacts in said connection socket to face in a direction parallel to a direction of force.

7. A device as in claim 6, further comprising an electromagnet on said connection socket, and said electrical cord includes a part that is attracted to said electromagnet.

8. A device as in claim 6, wherein said electrical cord includes a protection portion formed from a section of an elastomeric sphere, where said elastomeric sphere is hollow and where an electrical contact in said electrical cord is spaced from but attached to an inside portion of said elastomeric sphere and spaced from at least a portion of said elastomeric sphere, and further comprising first and second connection structures, connected to first and second portions of said electrical cord that has said electrical contact, and first and second portions of an inside of said elastomeric sphere, with no connections connected between said first and second portions thereby leaving an area of empty space between said at least one portion of said sphere and said portion of said electrical cord that has said electrical contact, and wherein the area of said empty space is configured to allow the deformation of said elastomeric sphere in said area of empty space.

9. A device as in claim 6, wherein said elongated element is a blade.

10. A method, comprising:
    detecting a mode of a vehicle, a first mode being a mode in which the vehicle is in a stationary mode;
    connecting an electrical cord to a vehicle to charge the vehicle, where one of a connection socket on the vehicle, and said electrical cord includes a first electrical contact in the shape of an elongated element and the other of said connection socket and said electrical cord includes second and third electrical contacts which are spaced from one another;
    based on said detecting said mode where said vehicle is in said stationary mode, automatically moving said second and third electrical contacts closer to one another to hold said first electrical contact tight between said second and third electrical contacts to hold said electrical cord more securely to said vehicle;

based on said detecting said mode where said vehicle is not in said stationary mode, automatically moving said second and third electrical contacts further apart relative to one another to hold said second electrical contact less tight between said second and third electrical contacts to hold said electrical cord less securely; and further comprising pivoting a connection socket to move a direction of contacts in said connection socket to face parallel to a direction of force.

11. A method as in claim 10, further comprising actuating an electromagnet on said connection socket to hold said electrical cord attracted to said electromagnet.

12. A method as in claim 10, wherein said actuating comprises moving an electrical contact in or out relative to said vehicle.

13. A method as in claim 10, further comprising using an electrical cord to connect to said vehicle, and using a hollow, ball shaped elastomeric part on an end of the electrical cord, with a hollow part defining a space between an outside of the part and an electrical connection in said part, and further comprising first and second connection structures, connected to first and second portions of said electrical cord that has said electrical contact, and first and second portions of an inside of said elastomeric sphere, with no connections connected between said first and second portions thereby leaving an area of empty space between said at least one portion of said part and said electrical portion of said electrical cord that has said electrical contact, and wherein the area of said empty space is configured to allow the deformation of said elastomeric sphere in said area of empty space, and configuring said ball shaped part to deform in said area of said empty space and to bounce if it hits the ground.

14. A method as in claim 10, wherein said first mode is said car being in park.

15. A method as in claim 10, further comprising said vehicle being in a movable mode, operating said electrical part to hold said electric cord less securely to said vehicle.

* * * * *